US012467418B2

(12) United States Patent
Luo et al.

(10) Patent No.: US 12,467,418 B2
(45) Date of Patent: Nov. 11, 2025

(54) RIB STRUCTURE ON CYLINDER BLOCK

(71) Applicant: CUMMINS INC., Columbus, IN (US)

(72) Inventors: Yuan Luo, Wuhan (CN); Xiling Zhou, Wuhan (CN)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/290,335

(22) PCT Filed: Aug. 4, 2022

(86) PCT No.: PCT/US2022/039455
§ 371 (c)(1),
(2) Date: Nov. 13, 2023

(87) PCT Pub. No.: WO2023/027878
PCT Pub. Date: Mar. 2, 2023

(65) Prior Publication Data

US 2024/0247619 A1 Jul. 25, 2024

(30) Foreign Application Priority Data

Aug. 26, 2021 (CN) ......................... 202110989167.5

(51) Int. Cl.
*F02B 75/18* (2006.01)
*F02B 75/20* (2006.01)
*F02F 7/00* (2006.01)

(52) U.S. Cl.
CPC ............ *F02F 7/0021* (2013.01); *F02B 75/20* (2013.01); *F02F 7/0007* (2013.01)

(58) Field of Classification Search
CPC ........ F02F 1/163; F02F 7/0007; F02F 7/0021; F02F 2001/008; F02B 75/20
(Continued)

(56) References Cited

U.S. PATENT DOCUMENTS 3,183,794 A 5/1965 Hind
5,669,346 A * 9/1997 Leweux .................. F01L 1/024
123/195 H
(Continued)

FOREIGN PATENT DOCUMENTS

CN 202117782 U 1/2012
CN 106438088 A 2/2017
(Continued)

OTHER PUBLICATIONS

International Search Report and Written Opinion for PCT Application No. PCT/US2022/039455, dated Oct. 21, 2022, pp. 1-50.

*Primary Examiner* — Logan M Kraft
*Assistant Examiner* — James J Kim
(74) *Attorney, Agent, or Firm* — Foley & Lardner LLP

(57) ABSTRACT

The present application relates to rib structure on cylinder block. A cylinder block having a top surface, an inner bottom surface, a cylinder opening on the top surface, and a head boss positioned on the top surface, centered on a first axis, and configured to engage with a fastener at an initial position, which defines a first depth. The cylinder block includes a first main boss positioned on the inner bottom surface, centered on a second axis, and configured to engage with a first main fastener at a first end position, which defines a second depth. The cylinder block includes a second main boss positioned on the inner bottom surface and configured to engage with a second main fastener at a second end position, which defines a third depth. The cylinder block includes a first rib path extending from the first depth to the second depth and a second rib path extending from the first depth to the third depth.

20 Claims, 7 Drawing Sheets

(58) Field of Classification Search
USPC ........................................................ 123/56.1
See application file for complete search history.

(56) References Cited

U.S. PATENT DOCUMENTS

| | | | | |
|---|---|---|---|---|
| 6,070,562 | A * | 6/2000 | Van Bezeij ................ | F16J 9/02 384/429 |
| 7,721,688 | B2 * | 5/2010 | Kamiyama ........... | F02B 75/041 123/48 B |
| 2004/0035375 | A1 * | 2/2004 | Gibisch ................. | F02F 7/0007 123/41.74 |
| 2015/0315996 | A1 * | 11/2015 | Quinton ................ | F02F 7/0068 29/888.06 |
| 2021/0310439 | A1 * | 10/2021 | Zhou ..................... | F02F 7/0021 |

FOREIGN PATENT DOCUMENTS

| | | | |
|---|---|---|---|
| CN | 206280151 | U | 6/2017 |
| CN | 110425055 | A | 11/2019 |
| DE | 637372 | C | 10/1936 |
| DE | 10260197 | A1 | 7/2004 |
| GB | 2 541 014 | A | 2/2017 |
| JP | 2000-170603 | A | 6/2000 |
| JP | 2002-115602 | A | 4/2002 |

* cited by examiner

RIB STRUCTURE ON CYLINDER BLOCK

CROSS-REFERENCE TO RELATED PATENT APPLICATIONS

This application is the U.S. national phase of PCT Application No. PCT/US2022/039455, filed Aug. 4, 2022, which claims priority to and the benefit of Chinese Patent Application No. 202110989167.5, filed Aug. 26, 2021, the contents of which are herein incorporated by reference in their entireties.

TECHNICAL FIELD

The present disclosure relates generally to a cylinder block of an internal combustion engine.

BACKGROUND

Internal combustion engines include a cylinder head and a cylinder block. Internal combustion engines typically undergo large operational loads. These operational loads can cause distortion in the cylinders of the cylinder block and early fatigue issues. This can result in increased oil consumption by the internal combustion engine, undesirable engine performance, and, may even result in engine failure.

SUMMARY

One embodiment relates to a cylinder block comprising a cylinder block body having a top surface and an inner bottom surface positioned axially opposed from the top surface. The cylinder block body includes a cylinder opening disposed on the top surface. The cylinder block body further includes a head boss positioned on the top surface, centered on a first axis, and configured to threadingly engage with a head fastener at an initial position. The initial position defines a first depth away from the top surface. The cylinder block body further includes a first main boss positioned on the inner bottom surface, centered on a second axis parallel to or coaxial with the first axis, and configured to threadingly engage with a first main fastener at a first end position. The first end position defines a second depth from the inner bottom surface. The cylinder block body further includes a second main boss positioned on the inner the bottom surface, centered on a third axis parallel to the first axis, and configured to threadingly engage with a second main fastener at a second end position. The second end position defines a third depth from the inner bottom surface. The cylinder block body further includes a first rib path extending from the first depth to the second depth and a second rib path extending from the first depth to the third depth.

In some embodiments, the cylinder block body further comprises: a second head boss disposed on the top surface, the second head boss centered a fourth axis parallel to or coaxial with the third axis, the second head boss configured to threadingly engage with a second head fastener at a second initial position, the second initial position defining a fourth depth from the top surface; a third rib path extending from the fourth depth to the third depth; and a fourth rib path extending from the fourth depth to the second depth.

In some embodiments, a length of the first depth is equal to a length of the fourth depth; and the fourth rib path intersects with the second rib path.

In some embodiments, a length of the second depth is equal to a length of the third depth.

In some embodiments, the cylinder opening defines a cylinder axis parallel to the first axis and parallel to the third axis.

In some embodiments, a center of the first main boss and a center of the cylinder opening define a first distance, a center of the second main boss and the center of the cylinder opening define a second distance, and the second distance is equal to the first distance.

In some embodiments, the first rib path and the second rib path extend radially away from the cylinder opening.

In some embodiments, the first rib path and the second rib path are positioned on an exterior wall of the cylinder block body.

In some embodiments, the first rib path and the second rib path are positioned on an interior wall of the cylinder block body.

In some embodiments, a wall of the cylinder block body is composed of a first material, and the first rib path is composed of a second material.

Another embodiment relates to a cylinder block including a cylinder block body that includes a top surface and an inner bottom surface that is positioned axially opposed from the top surface. The cylinder block body further includes a head boss positioned on the top surface, centered on a first axis, and having a counter bore positioned a first depth into the top surface. The cylinder block body further includes a first main boss positioned on the inner bottom surface, centered on a second axis parallel to or coaxial with the first axis, and having a first fastening means positioned a second depth into the inner bottom surface. The cylinder block body further includes a second main boss positioned on the inner bottom surface, centered on a second axis parallel to the first axis, and having a second fastening means positioned a third depth into the inner bottom surface. The cylinder block body further includes a first reinforced area extending from the first depth to the second depth, and a second reinforced area extending from the first depth to the third depth.

In some embodiments, the cylinder block body further comprises: a second head boss disposed on the top surface, the second head boss centered on a fourth axis parallel to or coaxial with the second axis, the second head boss having a second counter bore positioned a fourth depth into the top surface; a third reinforced area extending from the fourth depth to the third depth; and a fourth reinforced area extending from the fourth depth to the second depth.

In some embodiments, a length of the first depth is equal to a length of the fourth depth; and the fourth reinforced area intersects with the second reinforced area.

In some embodiments, a length of the second depth is equal to a length of the third depth.

In some embodiments, the cylinder block body further comprises a cylinder opening having a cylinder axis parallel to the first axis and parallel to the third axis.

In some embodiments, a center of the first main boss and a center of the cylinder opening define a first distance, a center of the second main boss and the center of the cylinder opening define a second distance, and the second distance is equal to the first distance.

In some embodiments, the first reinforced area and the second reinforced area extend radially away from the first axis.

In some embodiments, the first reinforced area and the second reinforced area are positioned on an exterior wall of the cylinder block body.

In some embodiments, the first reinforced area and the second reinforced area are positioned on an interior wall of the cylinder block body.

In some embodiments, a wall of the cylinder block body comprises a first material, and the first reinforced area comprises a second material.

In some embodiments, the first reinforced area and the second reinforced area comprise cylinder ribs formed into the cylinder block body.

In some embodiments, the cylinder block body further comprises: a plurality of cylinder openings; a plurality of sets of head fasteners disposed on the top surface, each of the plurality of sets of head fasteners positioned circumferentially around a respective cylinder opening of the plurality of cylinder openings; and a plurality of sets of main fasteners disposed on the inner bottom surface, each of the plurality of sets of main fasteners positioned circumferentially around a respective cylinder opening of the plurality of cylinder openings.

In some embodiments, a first set of head fasteners comprises a first head fastener, a second head fastener, a third head fastener, and a fourth head fastener, the first set of head fasteners positioned circumferentially around a first cylinder opening of the plurality of cylinder openings, and a second set of head fasteners comprises the first head fastener, the second head fastener, a fifth head fastener, and a sixth head fastener, the second set of head fasteners positioned circumferentially around a second cylinder opening of the plurality of cylinder openings, the second cylinder opening adjacent the first cylinder opening.

In some embodiments, a first set of main fasteners comprises a first main fastener, a second main fastener, a third main fastener, and a fourth main fastener, the first set of main fasteners positioned circumferentially around a first cylinder opening of the plurality of cylinder openings, and a second set of main fastener comprises the first main fastener, the second main fastener, a fifth main fastener, and a sixth main fastener, the second set of main fasteners positioned circumferentially around a second cylinder opening of the plurality of cylinder openings, the second cylinder opening adjacent the first cylinder opening.

DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
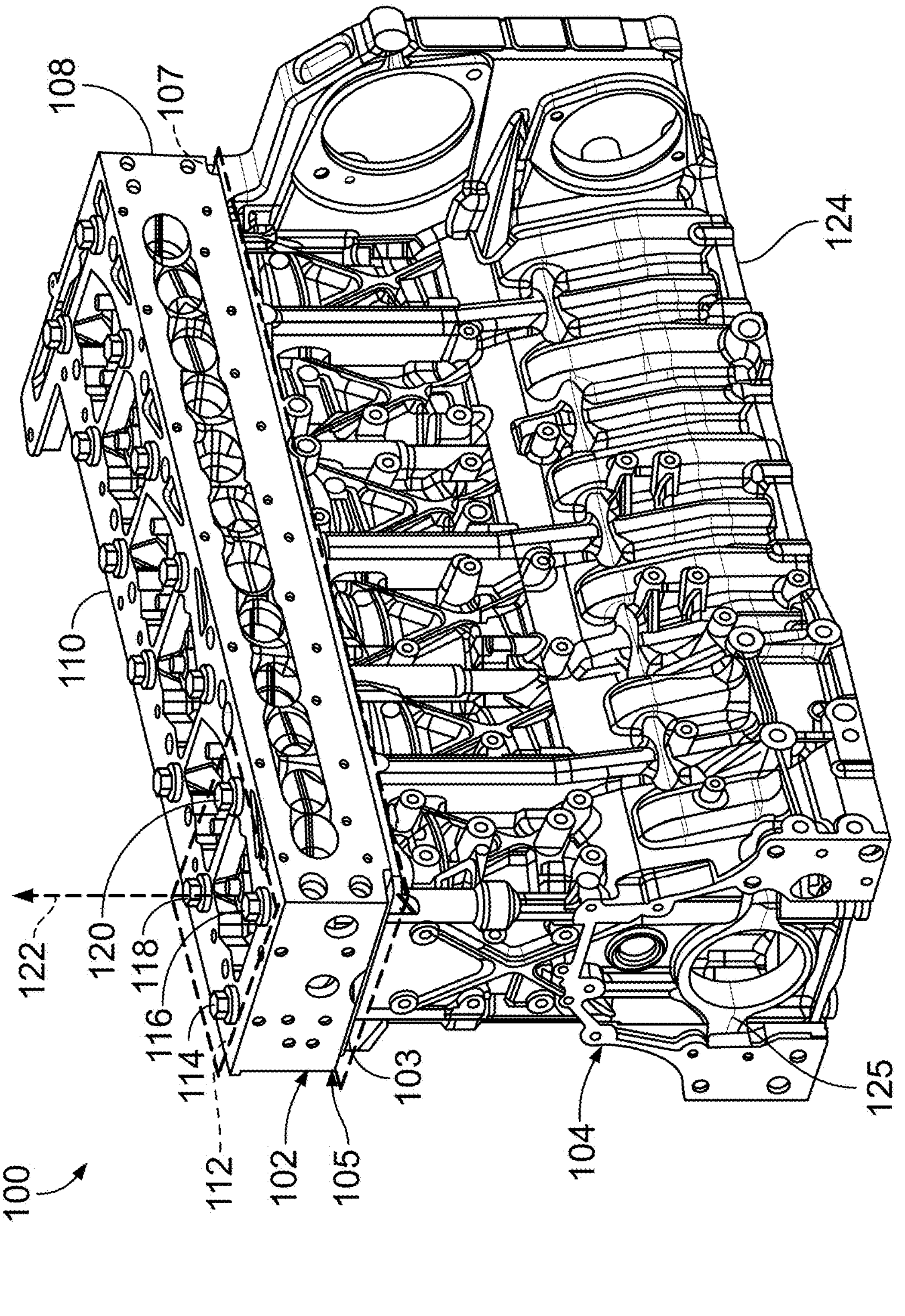
FIG. 1 is a perspective view of an internal combustion engine according to an example embodiment.

It will be recognized that the figures are schematic representations for purposes of illustration. The figures are provided for the purpose of illustrating one or more implementations with the explicit understanding that the figures will not be used to limit the scope or the meaning of the claims.

DETAILED DESCRIPTION OF VARIOUS EMBODIMENTS

Following below are more detailed descriptions of various concepts related to, and implementations of a rib structure on a cylinder block. The methods, apparatuses, and systems introduced herein may be implemented in various ways, as the described concepts are not limited to any particular manner of implementation. Examples of specific implementations and applications are provided primarily for illustrative purposes.

I. OVERVIEW

An internal combustion engine includes a cylinder head and a cylinder block. The cylinder head is attached to the cylinder block through the use of fasteners. Stresses accumulates within the cylinder head and cylinder block during operation of the internal combustion engine. These stresses can cause fatigue and distortion in the cylinder block. This fatigue and distortion may cause the internal combustion engine to become less efficient, may result in increased oil consumption, and may even also cause engine failure.

II. EXAMPLE CYLINDER HEAD AND CYLINDER BLOCK

FIGS. 1-8 variously depict portions of an internal combustion engine 100. The internal combustion engine 100 is configured to utilize chemical energy from fuel to produce mechanical energy. Specifically, the internal combustion engine 100 combusts (e.g., burns, etc.) fuel through a combustion process which occurs within at least one cylinder (e.g., combustion chamber, etc.) of the internal combustion engine 100.

The internal combustion engine 100 includes a piston positioned within each cylinder. The internal combustion engine 100 may include any number of cylinders and an equal corresponding number of pistons. For example, the internal combustion engine 100 may include one, two, three, four, five, six, seven, eight, nine, ten, twelve, or more cylinders and an equal number of pistons. Each piston is configured to move within the associated cylinder. Each piston is operatively connected to an output of the internal combustion engine 100 to produce mechanical energy (e.g., via connecting rods and a crankshaft, etc.).

In various embodiments, the internal combustion engine 100 is a diesel internal combustion engine and consumes diesel fuel. In other embodiments, the internal combustion engine 100 consumes gasoline (e.g., petrol, etc.) and is a gasoline internal combustion engine. In other applications, the internal combustion engine 100 consumes natural gas (e.g., liquid natural gas, compressed natural gas (CNG), etc.), biofuel (e.g., biomass, etc.) ethanol (e.g., E-85, etc.), and other similar fuels. In still other embodiments, the internal combustion engine 100 is a dual-fuel internal combustion engine and consumes two different fuels (e.g., diesel and gasoline, diesel and ethanol, gasoline and ethanol, natural gas and diesel, etc.).

The internal combustion engine 100 includes a cylinder head 102 and a cylinder block 104. The aforementioned pistons and cylinders are variously positioned within the cylinder block 104. The cylinder head 102 is coupled to the cylinder block 104 using a plurality of head fasteners inserted from a top surface of the cylinder head 102. As will be explained in more detail herein, each cylinder of the internal combustion engine 100 includes a set number of head fasteners from a plurality of head fasteners. As will also be further explained in more detail herein, the plurality of head fasteners threadingly only engage the cylinder block 104, and not the cylinder head 102, such that the cylinder head 102 is held against the cylinder block 104.

In some embodiments, a head gasket 103 is interposed between a bottom surface of the cylinder head and a top surface 105 of the cylinder block 104. The head gasket 103 may be any suitable gasket such as, but limited to an o-ring, a fiber washer, a paper gasket, a cylinder gasket and may comprise any suitable gasket material. The head gasket 103 may be used as a sealing mechanism for a fluid such as, but not limited to, a coolant, a lubricating fluid (e.g., oil), gas, any other suitable fluid, or combinations thereof. The plurality of head fasteners may provide the sealing mechanism for the head gasket 103. A sealant may be applied to the head gasket 103 to seal the fluid. Each of the plurality of head fasteners includes a fastener head and a fastener body. The fastener head may be, for example, a hex head, a Phillips head, a regular head (e.g., to receive a regular screwdriver, etc.), a Torx head (e.g., an external Torx head, an internal Torx head, a security Torx head, etc.), an Allen head, and other similar fastener heads. The fastener body is at least partially threaded. For example, the fastener body may be fully threaded or may include portions (e.g., a middle portion, a central portion, etc.) which are not threaded. In various embodiments, the fastener head is flanged. However, in other embodiments, the fastener head is not flanged. Various washers may be utilized to separate the fastener head from the cylinder head 102 such that the internal combustion engine 100 is tailored for a target application.

The cylinder head 102 interfaces with the cylinder block 104 along a cylinder head-block interface 107. In various embodiments, the cylinder head-block interface 107 is disposed along a plane. For example, the cylinder head-block interface 107 may be disposed along a horizontal plane (e.g., a plane which is parallel to the horizontal, a plane which is parallel to a ground surface, etc.).

The cylinder head 102 is defined by a first side 108 (e.g., a hot side, a cold side, exhaust side, intake side, etc.) and a second side 110 (e.g., a cold side, a hot side, intake side, exhaust side, etc.). The first side 108 is opposite the second side 110.

The plurality of head fasteners includes sets of head fasteners 112. Each set of head fasteners 112 is designated for a cylinder of the internal combustion engine 100. Each set of head fasteners 112 includes a first head fastener 114, a second head fastener 116, a third head fastener 118, and a fourth head fastener 120. In an example embodiment, a set of head fasteners 112 share head fasteners with other sets of head fasteners 112 for adjacent cylinders. In other words, the same head fasteners may be used for multiple sets of head fasteners 112 simultaneously. For example, a first set of head fasteners 112 may share main fasteners with a second set of head fasteners 112 such that the first set of main fasteners and the second set of main fasteners are positioned circumferentially around adjacent a top of cylinder openings 111 of the cylinders.

Each cylinder defines a cylinder axis 122 (e.g., center axis, etc.). As discussed in greater detail herein, each of the plurality of head fasteners are positioned in a head boss (e.g., hole, aperture, multi-diameter hole, bore, etc.) that extends parallel to the cylinder axis 122 along the length of the cylinder head 102 and partially along the length of the cylinder block 104. In some embodiments, the head boss defines a through-hole portion (e.g., non-threaded holes, etc.) along the length of the cylinder head 102 and a threaded portion partially along the length of the cylinder block 104. In such embodiments, the head boss may be positioned on and extend through a top surface 105 of the cylinder block 104.

In various embodiments, the first head fastener 114, the second head fastener 116, the third head fastener 118, and the fourth head fastener 120 are configured such that the first head fastener 114, the second head fastener 116, the third head fastener 118, and the fourth head fastener 120 are substantially equidistant from a cylinder axis 122 (e.g., a difference between a first distance between the first head fastener 114 and the cylinder axis 122, a second distance between the second head fastener 116 and the cylinder axis 122, a third distance between the third head fastener 118 and the cylinder axis 122, and a fourth distance between the fourth head fastener 120 and the cylinder axis 122 is less than or equal to 1%, 3%, 5%, etc.). In other embodiments, the first head fastener 114, the second head fastener 116, the third head fastener 118, and the fourth head fastener 120 are configured such that the first head fastener 114, the second head fastener 116, the third head fastener 118, and the fourth head fastener 120 are not equidistant from the cylinder axis 122. In various embodiments, any combination of the first head fastener 114, the second head fastener 116, the third head fastener 118, and the fourth head fastener 120 may be equidistant from the cylinder axis 122. For example, the first head fastener 114 and the second head fastener 116 may be equidistant from the cylinder axis 122 and the third head fastener 118 and the fourth head fastener 120 may be equidistant from the cylinder axis 122, but the first head fastener 114, the second head fastener 116, the third head fastener 118, and the fourth head fastener 120 are not all equidistant from the cylinder axis 122. In these ways, the cylinder head 102 and the cylinder block 104 may be substantially symmetrical about the cylinder axis 122 (e.g., about a plane extending along the cylinder head 102 and cylinder block 104 that is coincident with the cylinder axis 122, etc.) or non-symmetrical about the cylinder axis 122 (e.g., about a plane extending along the cylinder head 102 and cylinder block 104 that is coincident with the cylinder axis 122, etc.).

The cylinder head 102 is coupled to the cylinder block 104 by inserting each of the plurality of head fasteners into the head boss through the through-hole along the length of the cylinder head 102, then contacting the top surface 105 of the cylinder block 104, and then threading each of the plurality of head fasteners into the threaded portion partially along the length of the cylinder block 104. The plurality of head fasteners may then be tightened to a target torque (e.g., one-hundred foot pounds, etc.). A reverse of this process is implemented for removing the plurality of head fasteners from each respective head boss and thereby at least partially uncoupling (e.g., detaching, removing, etc.) the cylinder head 102 from the cylinder block 104.

The cylinder head 102 has a greater cross-sectional area (e.g., measured along a plane parallel to the cylinder head-block interface 107, etc.) proximate the top surface 105 of the cylinder block 104 than proximate the cylinder head-block interface 107. This greater cross-sectional area of the cylinder head 102 proximate the top surface 105 of the cylinder block 104 mitigates local yielding (e.g., deformation, etc.) and/or galling (e.g., wearing, marring, etc.) of the cylinder head 102. Furthermore, this greater cross-sectional area of the cylinder head 102 proximate the top surface 105 of the cylinder block 104 may minimize or eliminate the need for washers or spacers between the plurality of head fasteners and the top surface 105 of the cylinder block 104, thereby reducing the cost and simplifying the manufacturing of the internal combustion engine 100.

The cylinder head 102 also has a lower cross-sectional area proximate the cylinder head-block interface 107 than proximate the top surface 105 of the cylinder block 104. This lower cross-sectional area of the cylinder head 102 proximate the cylinder head-block interface 107 decreases a surface area of the cylinder head-block interface 107.

The cylinder block 104 includes a bottom surface 124 (e.g., bottom side, bottom plane, etc.). The bottom surface 124 is positioned on an opposite side of the top surface 105 of the cylinder block 104 away from the cylinder head-block interface 107. The cylinder block 104 further includes an inner bottom surface 125 positioned on an opposite side of the top surface 105 of the cylinder block 104 and vertically in between the bottom surface 124 and the top surface 105 of the cylinder block 104. The internal combustion engine 100 further includes a plurality of main fasteners that are inserted through the inner bottom surface 125.

Each of the plurality of main fasteners includes a fastener head and a fastener body. The fastener head may be, for example, a hex head, a Phillips head, a regular head (e.g., to receive a regular screwdriver, etc.), a Torx head (e.g., an external Torx head, an internal Torx head, a security Torx head, etc.), an Allen head, and other similar fastener heads. The fastener body is at least partially threaded. For example, the fastener body may be fully threaded or may include portions (e.g., a middle portion, a central portion, etc.) which are not threaded. In various embodiments, the fastener head is flanged. However, in other embodiments, the fastener head is not flanged. Various washers may be utilized to separate the fastener head from the cylinder block 104 such that the internal combustion engine 100 is tailored for a target application.

Figure 2:
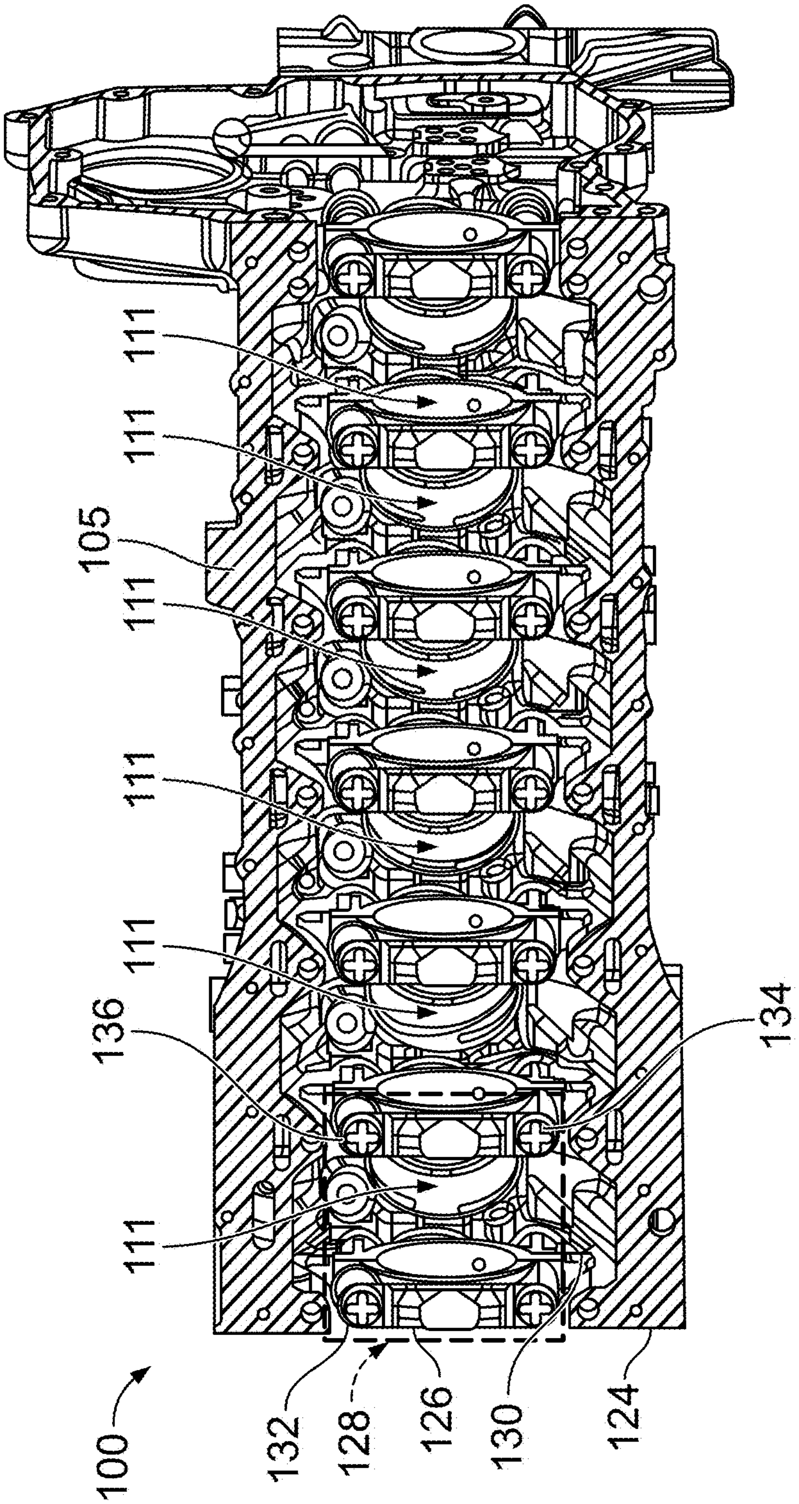
FIG. 2 is a bottom view of the internal combustion engine depicted in FIG. 1.

As shown in FIG. 2, the plurality of main fasteners includes sets of main fasteners 128 for each cylinder of the internal combustion engine 100. Each of the sets of main fasteners 128 includes a first main fastener 130, a second main fastener 132, a third main fastener 134, and a fourth main fastener 136. In an example embodiment, a set of main fasteners shares main fasteners with other sets of main fasteners 128 for adjacent cylinders. In other words, the same main fasteners of the plurality of main fasteners may be used for different sets of main fasteners 128. For example, a first set of main fasteners may share main fasteners with a second set of main fasteners such that the first set of main fasteners and the second set of main fasteners are positioned circumferentially around adjacent a bottom of the cylinder openings 111 of the cylinders.

Each of the plurality of main fasteners are positioned in a main boss (e.g., hole, aperture, multi-diameter hole, bore, etc.) that extends parallel to the cylinder axis 122 partially along the length of the cylinder block 104. Each main boss may define a through-hole portion (e.g., non-threaded holes, etc.) along the length of a plurality of main bearing caps 126 and a threaded portion partially along the length of the cylinder block 104. In such embodiments, the main fasteners threadingly engage with only the cylinder block 104. In some embodiments, each main boss defines a through-hole portion and a threaded portion along the length of the plurality of main bearing caps 126 and a threaded portion partially along the length of the cylinder block 104. In such embodiments, the main boss may be positioned on and extend through the inner bottom surface of the cylinder block 104. In such embodiments, the main fasteners threadingly engage with both the plurality of main bearing caps 126 and the cylinder block 104.

The plurality of main bearing caps 126 are selectively coupled to the cylinder block 104 and may hold the cylinder block 104 in place. When coupled to the cylinder block 104, the plurality of main bearing caps 126 may be in contact with the bottom inner surface of the cylinder block 104. The plurality main bearing caps 126 may comprise any suitable bearing such as, but not limited to, plain bearings, journal bearings, etc. There may be two main bearing caps 126 for each set of main fasteners, or there may be less than two main bearing caps 126 for each set of main fasteners.

In various embodiments, the first main fastener 130, the second main fastener 132, the third main fastener 134, and the fourth main fastener 136 are configured such that the first main fastener 130, the second main fastener 132, the third main fastener 134, and the fourth main fastener 136 are substantially equidistant from a cylinder axis 122 (e.g., a difference between a first distance between the first main fastener 130 and the cylinder axis 122, a second distance between the second main fastener 132 and the cylinder axis 122, a third distance between the third main fastener 134 and the cylinder axis 122, and a fourth distance between the fourth main fastener 136 and the cylinder axis 122 is less than or equal to 1%, 3%, 5%, etc.). In other embodiments, the first main fastener 130, the second main fastener 132, the third main fastener 134, and the fourth main fastener 136 are configured such that the first main fastener 130, the second main fastener 132, the third main fastener 134, and the fourth main fastener 136 are not equidistant from the cylinder axis 122. In various embodiments, any combination of the first main fastener 130, the second main fastener 132, the third main fastener 134, and the fourth main fastener 136 may be equidistant from the cylinder axis 122. For example, the first main fastener 130 and the second main fastener 132 may be equidistant from the cylinder axis 122 and the third main fastener 134 and the fourth main fastener 136 may be equidistant from the cylinder axis 122, but the first main fastener 130, the second main fastener 132, the third main fastener 134, and the fourth main fastener 136 are not all equidistant from the cylinder axis 122.

Figure 3:
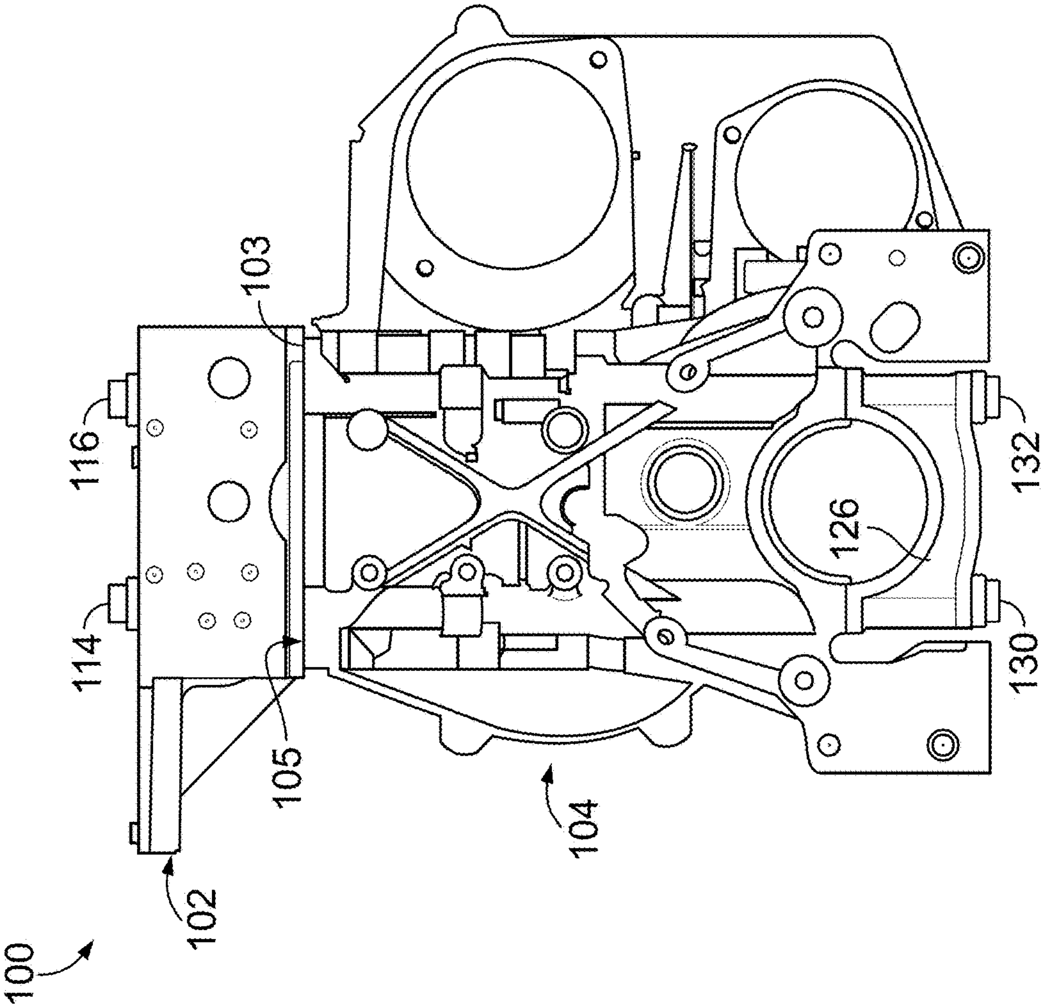
FIG. 3 is a side view of the internal combustion engine depicted in FIG. 1.

FIG. 3 is a side view of the internal combustion engine depicted in FIG. 1 and FIG. 2. As shown in FIG. 3, the cylinder head 102 is coupled to the cylinder block 104 by the first head fastener 114 and the second head fastener 116. A bottom surface of the cylinder head 102 may be contact the top surface 105 of the cylinder block 104. The first head fastener 114 and the second head fastener 116 are threadingly engaged with head bosses at an initial position. In some embodiments, the head bosses may be positioned on the top surface 105 of the cylinder block 104 and extend through the length of the cylinder head 102.

The main bearing cap 126 is coupled to the cylinder block 104 by the first main fastener 130 and the second main fastener 132. In such embodiments, the main bearing cap 126 may contact the inner bottom surface of the cylinder block 104. The first main fastener 130 and the second main fastener 132 are threadingly engaged with main bosses at a first end position. In some embodiments, the main bosses may be positioned on the bottom inner surface of the cylinder block 104 and extend through the length of the plurality of main bearing caps 126. The first head fastener 114, the second head fastener 116, the first main fastener 130, and the second main fastener 132 define an "I X I" bolt configuration expanded upon below.

Figure 4:
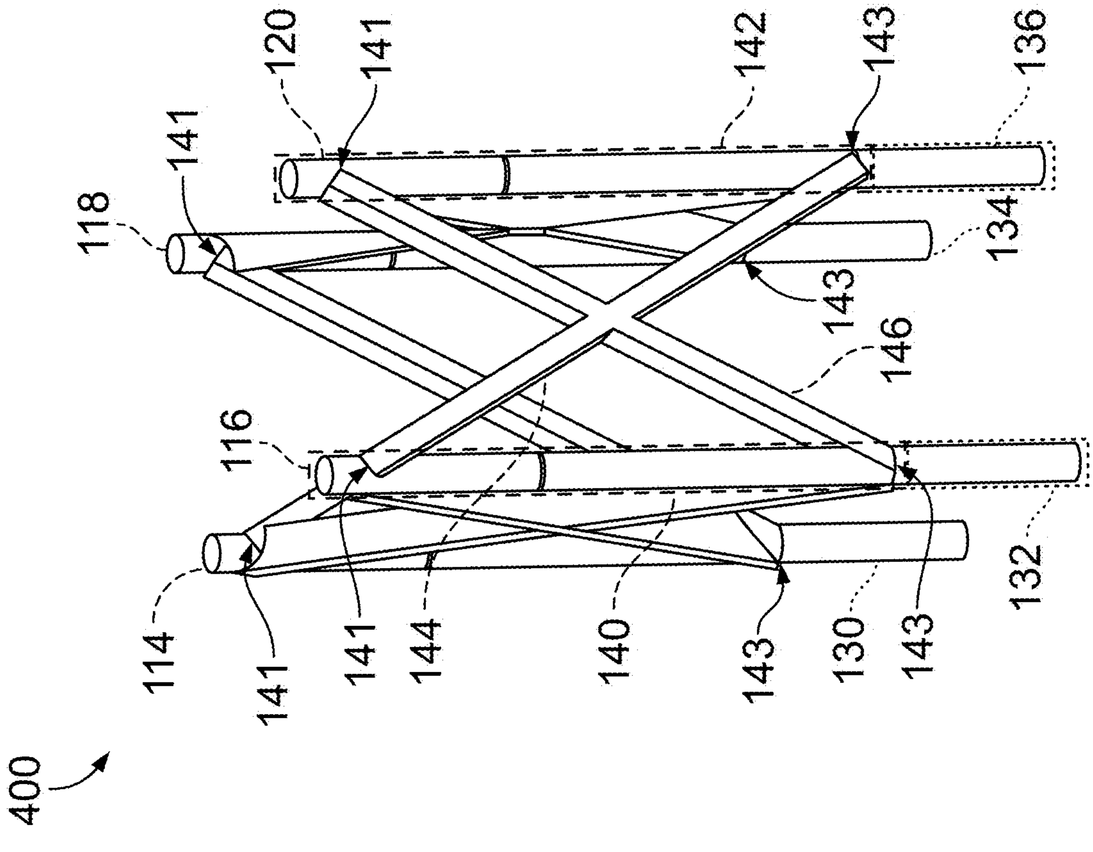
FIG. 4 is a perspective view of an example bolt layout for the internal combustion engine depicted in FIG. 1.

As illustrated in FIG. 4, in an example bolt configuration 300, each head fastener of the set of head fasteners 112 is substantially axially aligned with each main fastener of the set of main fasteners 128. In other words, the body of each head fastener and the body of each main fastener extend substantially along the same axis. Since the plurality of head fasteners and the plurality of main fasteners are on axially opposed surfaces, the last engaged thread of a head fastener of the plurality of head fasteners and the last engaged thread of a main fastener of the plurality of main fasteners are proximate to each other. This configuration directs operational loads experienced in the cylinder block 104 along desired load trajectories. As discussed in greater detail herein, the load trajectories extend along reinforced portions of the cylinder block 104, such as a cylinder block rib, and along the length of the head fasteners. These load trajectories create the "I X I" configuration for a side of the cylinder block 104. The "I X I" configuration is advantageous as it only requires four head fasteners and four main fasteners to complete the configuration. This reduces the number of fasteners required for the internal combustion engine 100. Additionally, as the main fasteners may share the same axis as a head fastener, the configuration facilitates cost effective and robust manufacturing of the internal combustion engine 100.

As further illustrated in FIG. 4, a first load trajectory 140 extends along a portion of the length of each of the head fasteners. The first load trajectory 140 extends from the initial thread (e.g., an initial position 141, etc.) engagement of the threaded portion of the head fastener to the end of the threaded portion of the head fastener (e.g., an end position 143, adjacent to the last engaged thread of the main fastener positioned on the same axis as the head fastener). The first load trajectory 140 directs the operational loads in an axis parallel to the cylinder axis 122, such that the load path of the operational loads are experienced on the respective head fastener and main fastener. For example, and as illustrated in FIG. 4, the first load trajectory 140 directs the load path onto the second head fastener 116 and the second main fastener 132. In some embodiments, the respective head fastener and the respective main fastener are on the same axis (e.g., coaxial). In such embodiments, the respective head boss that the respective head fastener is threadingly attached to and the respective main boss that the respective main fastener is threadingly attached to may be on the same axis (e.g., coaxial). In some embodiments, the respective head fastener and the respective main fastener are on different axes which are parallel to each other. In some embodiments, the two parallel axes are at a distance from each other in a range of about 0.5 to about 10 millimeters (e.g., 0.5 mm, 1 mm, 1.1 mm, 2 mm, 3 mm, 4 mm, 5 mm, 6 mm, 7 mm, 8 mm, 9 mm, or 10 mm). In such embodiments, the respective head boss that the respective head fastener is threadingly attached to and the respective main boss that the respective main fastener is threadingly attached to may be on different axes parallel to each other. As discussed in greater detail, the cylinder block 104 may include additional material (e.g., through molding, injection, welding, fastening, adhering, etc.) along the path of the first load trajectory 140. This provides additional support and robustness to the internal combustion engine 100 in a targeted and cost-effective manner. Accordingly, the first load trajectory 140 forms the first 'I' in the "I X I" configuration.

Similarly, a second load trajectory 142 also extends along a portion of the length of the head fasteners. The second load trajectory 142 extends from the initial thread engagement of the threaded portion of the head fastener to the end of the threaded portion of the head fastener (e.g., adjacent to the last engaged thread of the main fastener positioned on the same axis as the head fastener). The second load trajectory 142 directs operational loads in an axis parallel to the cylinder axis 122, such that the load path of the operational loads is experienced on the respective head fastener and main fastener. For example, and as illustrated in FIG. 4, the second load trajectory 142 directs the load path onto the fourth head fastener 120 and the fourth main fastener 136. In some embodiments, the respective head fastener and the respective main fastener are on the same axis (e.g., coaxial). In such embodiments, the respective head boss that the respective head fastener is threadingly attached to and the respective main boss that the respective main fastener is threadingly attached to may be on the same axis (e.g., coaxial). In some embodiments, the respective head fastener and the respective main fastener are on different axes parallel to each other. In such embodiments, the respective head boss that the respective head fastener is threadingly attached to and the respective main boss that the respective main fastener is threadingly attached to may be on different axes parallel to each other. In some embodiments, the two parallel axes are at a distance from each other in a range of about 0.5 to about 10 millimeters (e.g., 0.5 mm, 1 mm, 1.1 mm, 2 mm, 3 mm, 4 mm, 5 mm, 6 mm, 7 mm, 8 mm, 9 mm, or 10 mm). As discussed in greater detail, the cylinder block 104 may include additional material (e.g., through molding, injection, welding, fastening, adhering, etc.) along the path of the second load trajectory 142. This provides additional support and robustness to the internal combustion engine 100 in a targeted and cost-effective manner. Accordingly, the second load trajectory 142 forms the second 'I' in the "I X I" configuration.

A third load trajectory 144 extends from a top of a head fastener (e.g., the area nearest the top of the cylinder head 102, the area furthest away from the cylinder block 104, etc.) to the last engaged thread (e.g., the thread furthest from the bottom surface 124) of an adjacent main fastener (e.g., a main fastener that is not on the same axis as the head fastener relative to the cylinder axis 122). The third load trajectory 144 directs operational loads in an axis tangential to the cylinder axis 122, such that the load path of the operational loads is experienced along a rib of the cylinder block 104. For example, and as illustrated in FIG. 4, the third load trajectory 144 directs the load path from the top of a second head fastener 116 to the last engaged thread of the fourth main fastener 136. As discussed in greater detail, the cylinder block 104 may include additional material (e.g., through molding, injection, welding, fastening, adhering, etc.) along the path of the third load trajectory 144. This provides additional support and robustness to the internal combustion engine 100 in a targeted and cost-effective manner. Accordingly, the third load trajectory 144 forms a first portion of the 'X' in the "I X I" configuration.

A fourth load trajectory 146 extends from a top of a head fastener (e.g., the area nearest the top of the cylinder head 102, the area furthest away from the cylinder block 104) to the last engaged thread (e.g., the thread furthest from the bottom surface 124) of an adjacent main fastener (e.g., a main fastener that is not on the same axis as the head fastener relative to the cylinder axis 122). The fourth load trajectory 146 directs operational loads in an axis tangential to the cylinder axis 122, such that the load path of the operational loads is experienced along a rib of the cylinder block 104. For example, and as illustrated in FIG. 4, the fourth load trajectory 146 directs the load path from the top of a fourth head fastener 120 to the last engaged thread of the second main fastener 132. As discussed in greater detail, the cylinder block 104 may include additional material (e.g., through molding, injection, welding, fastening, adhering, etc.) along the path of the fourth load trajectory 146. This provides additional support and robustness to the internal combustion engine 100 in a targeted and cost-effective manner. Accordingly, the fourth load trajectory 146 forms a second portion of the ‘X’ in the “I X I” configuration.

Figure 5:
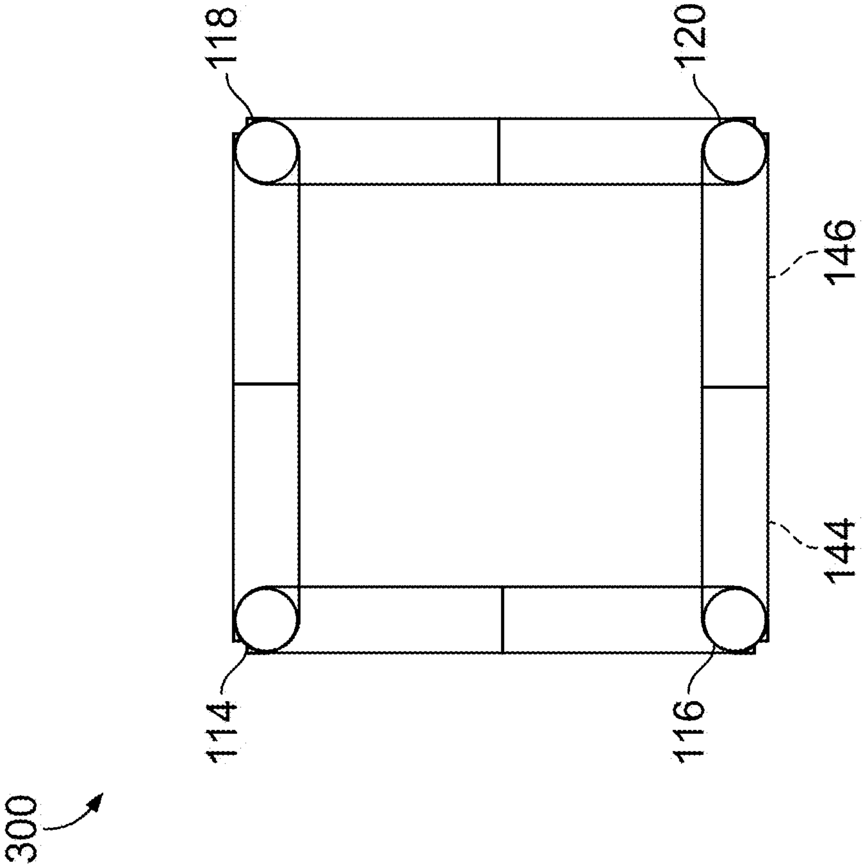
FIG. 5 is a top view of the bolt layout depicted in FIG. 4.

FIG. 5 illustrates a top view of the “I X I” configuration such that the first head fastener 114, the second head fastener 116, the third head fastener 118, and the fourth head fastener 120 are shown. In some embodiments, the “I X I” configuration is utilized on every side of each cylinder, such that the “I X I” configuration provides additional support for the operational loads on the exposed sides of the cylinder block 104 (e.g., the exterior walls of the cylinder block 104) and the interior of the cylinder block 104 (e.g., between each cylinder). In other embodiments, the “I X I” configuration is utilized in select cylinders and/or for select sides of each cylinder. For example, in a four cylinder internal combustion engine, the “I X I” configuration may be utilized only on the exposed sides of the cylinder block 104, such that the external cylinders (e.g. the most external of the cylinders) each have three cylinder walls utilizing the “I X I” configuration, while the middle cylinders (e.g., the internal cylinders), only have two cylinder walls utilizing the “I X I” configuration. In this way, the internal combustion engine 100 can maximize structural rigidity to address operational loads while decreasing the package size and manufacturing cost of the cylinder block 104.

Figure 6:
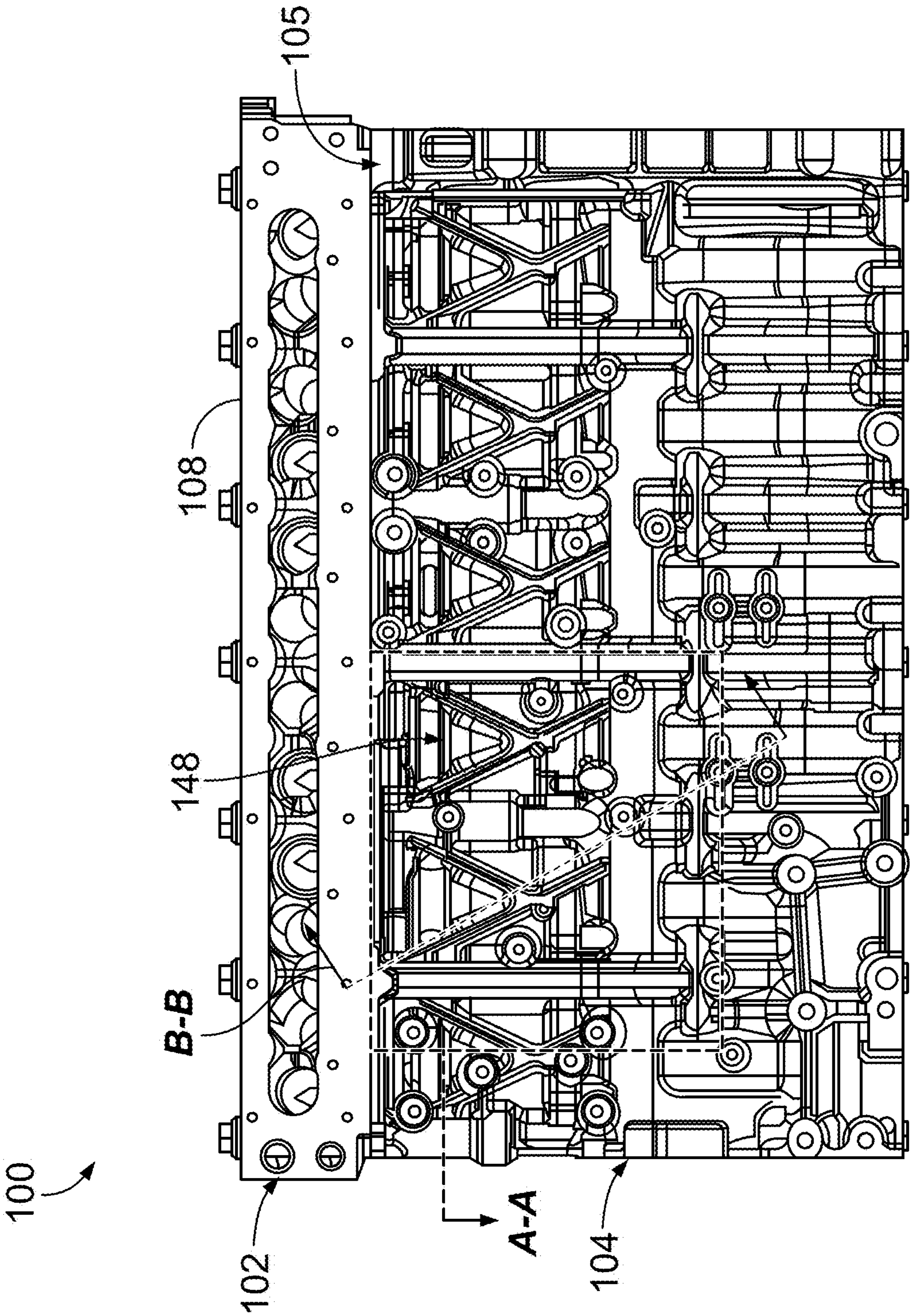
FIG. 6 is a side view of the internal combustion engine depicted in FIG. 1.

FIG. 6 is a side view of the internal combustion engine depicted in FIG. 1. As illustrated in FIG. 6, the cylinder block 104 defines an exterior profile 148 (e.g., design, template, pattern, etc.). The exterior profile 148 may be defined on all four walls of the cylinder block 104 (e.g., the first side 108, the second side 110, a front wall of the cylinder block 104, and a back wall of the cylinder block 104). The exterior profile 148 consists of additional material (or the absence of material) in order to increase the rigidity of the cylinder block 104 to prevent fatigue and distortion, while also achieving the desired package size, decreased manufacturing complexity, and a desired thermal profile.

Figure 7:
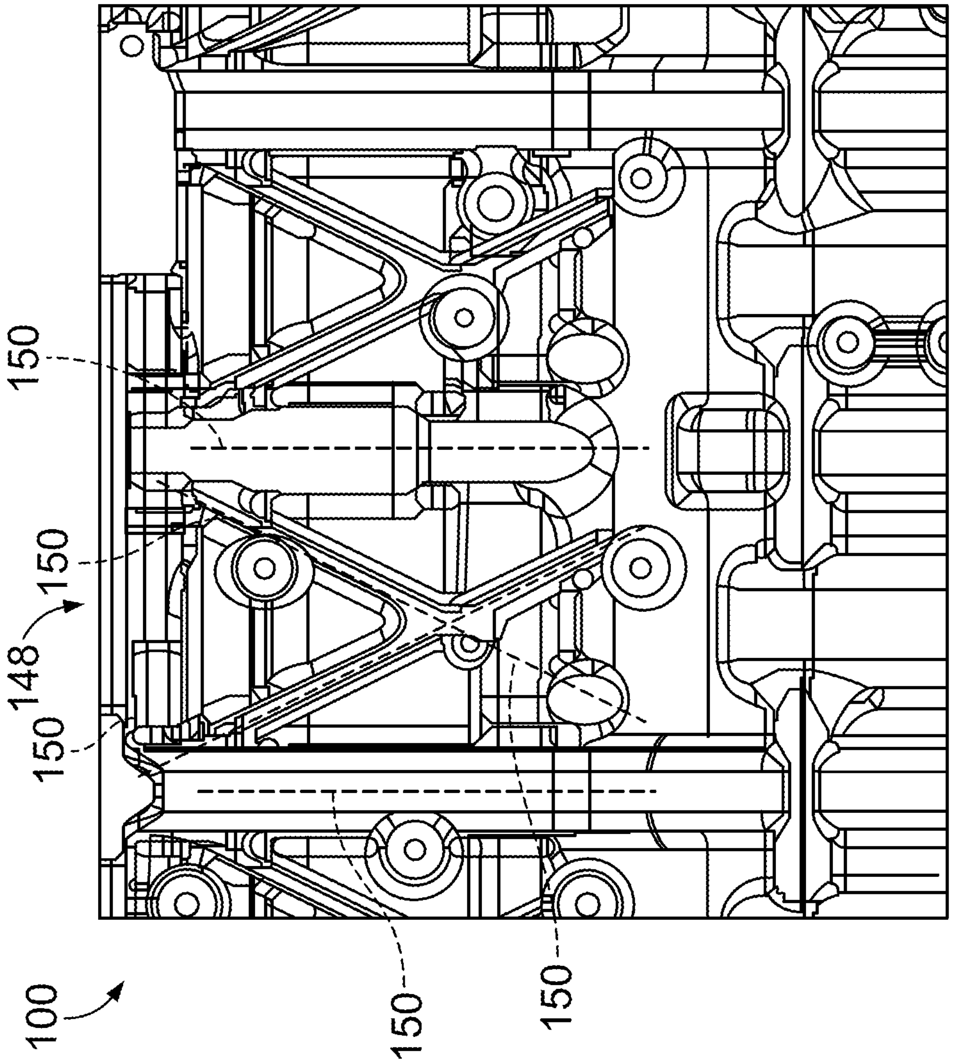
FIG. 7 is an enhanced view of the internal combustion engine depicted in FIG. 6.

FIG. 7 is an enhanced view of FIG. 6 taken along area A-A thereof. As illustrated in FIG. 7, the exterior profile 148 consists of additional material added to provide superior stability and rigidity to the cylinder block 104. The exterior profile 148 define a series of rib paths 150 (e.g., reinforced area, etc.). The series of rib paths 150 may be created via any number of manufacturing methods including, but not limited to, injection molding, welding, fastening, adhering, and 3D printing. In other embodiments, the rib paths 150 are made of a secondary material other than the base material used for the cylinder block 104. In these embodiments, the secondary material provides additional structure and rigidity to the cylinder block 104 in targeted locations. This is advantageous as more expensive materials or materials with superior rigidity, but other inferior attributes (e.g., inferior thermal attributes, etc.) are limited to the series of rib paths 150.

In an example embodiment, the series of rib paths 150 define a plurality of “I X I” shapes on the exterior profile 148. The “I X I” shapes correlate to the “I X I” bolt configuration discussed in FIG. 4. In other words, the series of rib paths 150 are positioned on the load paths defined by the bolt configuration. In this way, the operational loads of the internal combustion engine 100 are directed to areas having additional material and/or more rigid material. This is advantageous as it increases the structural rigidity of the cylinder block 104 and decreases distortion in the cylinder liners, while decreasing manufacturing costs and the package size of the cylinder block 104.

Figure 8:
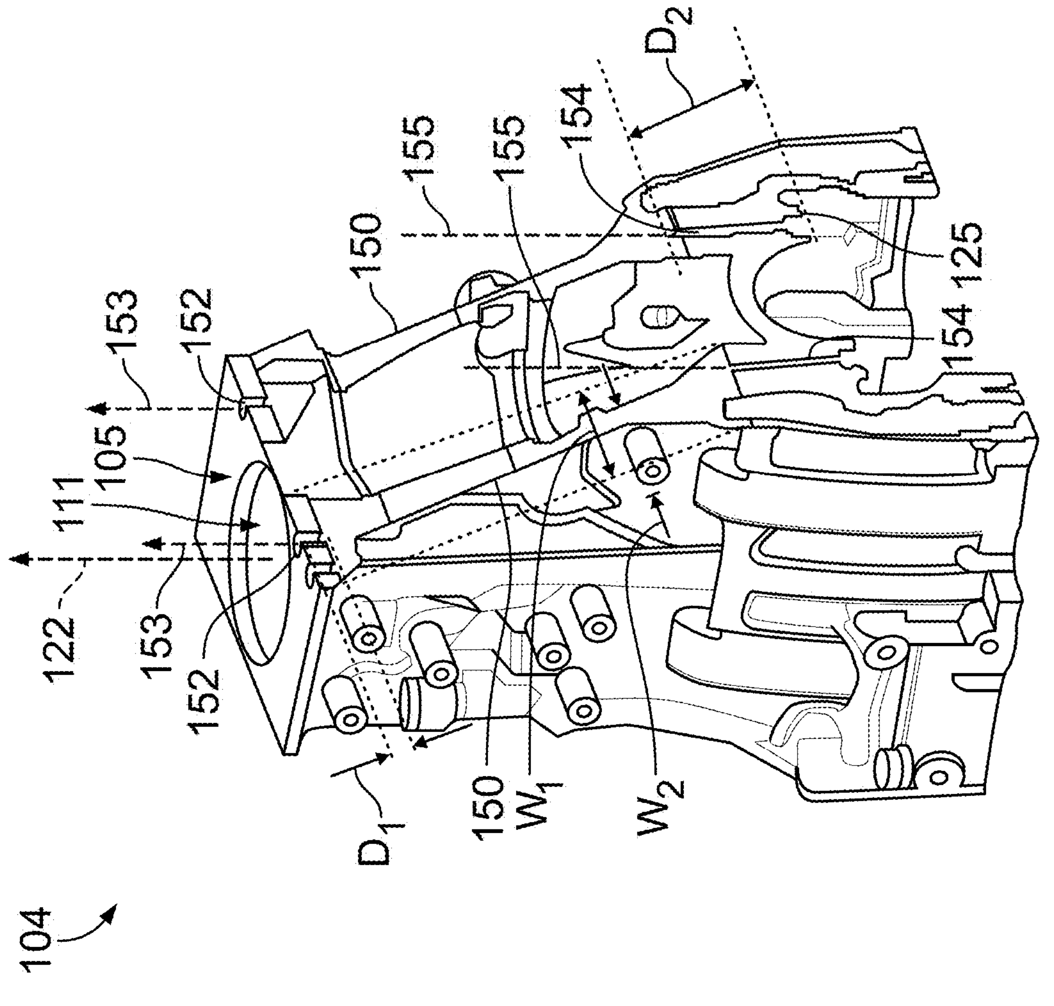
FIG. 8 is a cross-sectional view of a portion of the cylinder block depicted in FIG. 6.

FIG. 8 illustrates a cross-sectional view of FIG. 6 taken along the line B-B thereof. A selected number of the series of rib paths 150 are illustrated. As discussed in greater detail above, the series of rib paths 150 may include additional material and/or a secondary material. The additional material protrudes radially away from the cylinder (e.g., extend radially away from the cylinder axis 122). The additional material may extend a width W1. The width W1 may be 5-50% larger, inclusively, relative to a width W2 that is not within the desired load path.

The cylinder block 104 includes a plurality of head bosses 152 (e.g., hole, aperture, multi-diameter hole, bore, etc.). Each of the plurality of head bosses 152 are centered on an axis 153 parallel to the cylinder axis 122. In various embodiments, the plurality of head bosses 152 are partially threaded or fully threaded. The plurality of head bosses 152 include a counter bore extending a depth $D_1$ from the top surface 105 of the cylinder block. After being inserted into the cylinder head 102, each of the head fasteners are inserted into the plurality of head bosses 152. Each of the head fasteners are then fastened into the cylinder block 104 via the plurality of head bosses 152, causing the cylinder head 102 to be fastened to the cylinder block 104.

The cylinder block 104 also includes a plurality of main bosses 154 (e.g., hole, aperture, multi-diameter hole, bore, etc.). Each of the plurality of main bosses 154 are centered on an axis 155 parallel to the cylinder axis 122. In various embodiments, the plurality of main bosses 154 are partially threaded or fully threaded. Each of the main fasteners are fastened into the cylinder block 104 via the plurality of main bosses 154, causing the plurality of main bearing caps 126 to be fastened to the cylinder block 104. The plurality of head bosses 152 defines a depth D2 from the inner bottom surface 125 of the cylinder block 104 to the axial end of the plurality of main bosses 154 (e.g., the last engaged thread by the plurality of main fasteners).

III. CONSTRUCTION OF EXAMPLE EMBODIMENTS

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms “generally,” “substantially,” “similarly,” and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

What is claimed is:

1. A cylinder block, comprising:

a cylinder block body having a top surface, an inner bottom surface axially opposed from the top surface, and an exterior profile, the cylinder block body comprising:

a cylinder opening disposed on the top surface, the cylinder opening having a cylinder axis;

a first head boss disposed on the top surface, the first head boss centered on a first axis, the first head boss configured to threadingly engage with a first head fastener at a first initial position, the first initial position defining a first depth away from the top surface;

a first main boss disposed on the inner bottom surface, the first main boss centered on a second axis parallel to or coaxial with the first axis, the first main boss configured to threadingly engage with a first main fastener at a first end position, the first end position defining a second depth from the inner bottom surface;

a second main boss disposed on the inner bottom surface, the second main boss centered on a third axis parallel to the first axis, the second main boss configured to threadingly engage with a second main fastener at a second end position, the second end position defining a third depth from the inner bottom surface;

a second head boss disposed on the top surface, the second head boss centered on a fourth axis parallel to or coaxial with the third axis, the second head boss configured to threadingly engage with a second head fastener at a second initial position, the second initial position defining a fourth depth from the top surface;

the exterior profile defining a set of rib paths comprising:

a first rib path extending from the first depth to the second depth;

a second rib path extending from the first depth to the third depth; and a third rib path extending from the fourth depth to the third depth;

wherein the first rib path and the second rib path include additional material having a first width, the first width larger than a second width of a wall of the cylinder block, the additional material extending radially away from the cylinder axis.

2. The cylinder block of claim 1, wherein the set of rib paths further comprises a fourth rib path extending from the fourth depth to the second depth.

3. The cylinder block of claim 2, wherein:

a length of the first depth is equal to a length of the fourth depth; and the fourth rib path intersects with the second rib path.

4. The cylinder block of claim 1, wherein a length of the second depth is equal to a length of the third depth.

5. The cylinder block of claim 1, wherein the cylinder axis is parallel to the first axis and parallel to the third axis.

6. The cylinder block of claim 1, wherein:

a center of the first main boss and a center of the cylinder opening define a first distance, a center of the second main boss and the center of the cylinder opening define a second distance, and the second distance is equal to the first distance.

7. The cylinder block of claim 1, wherein the first rib path and the second rib path extend radially away from the cylinder opening.

8. The cylinder block of claim 1, wherein:

a wall of the cylinder block body is composed of a first material, and the first rib path is composed of a second material.

9. A cylinder block, comprising:

a cylinder block body comprising:

a cylinder opening having a cylinder axis;

a top surface;

an inner bottom surface positioned axially opposed from the top surface;

a first head boss disposed on the top surface, the first head boss centered on a first axis, the first head boss having a first counter bore positioned a first depth into the top surface;

a first main boss disposed on the inner bottom surface, the first main boss centered a second axis parallel to or coaxial with the first axis, the first main boss having a first fastening means positioned a second depth into the inner bottom surface;

a second main boss disposed on the inner bottom surface, the second main boss centered on a third axis parallel to the first axis, the second main boss having a second fastening means positioned a third depth into the inner bottom surface;

a second head boss disposed on the top surface, the second head boss centered on a fourth axis parallel to or coaxial with the second axis, the second head boss having a second counter bore positioned a fourth depth into the top surface;

a first reinforced area extending from the first depth to the second depth;

a second reinforced area extending from the first depth to the third depth; and a third reinforced area extending from the fourth depth to the third depth;

wherein the first reinforced area, the second reinforced area, and the third reinforced area are positioned on an exterior wall of the cylinder block body; and wherein the first reinforced area and the second reinforced area include additional material having a first width, the first width larger than a second width of a wall of the cylinder block, the additional material extending radially away from the cylinder axis.

10. The cylinder block of claim 9, wherein the cylinder block body further comprises a fourth reinforced area extending from the fourth depth to the second depth.

11. The cylinder block of claim 10, wherein:

a length of the first depth is equal to a length of the fourth depth; and the fourth reinforced area intersects with the second reinforced area.

12. The cylinder block of claim 9, wherein a length of the second depth is equal to a length of the third depth.

13. The cylinder block of claim 9, wherein the cylinder axis is parallel to the first axis and parallel to the third axis.

14. The cylinder block of claim 13, wherein:

a center of the first main boss and a center of the cylinder opening define a first distance, a center of the second main boss and the center of the cylinder opening define a second distance, and the second distance is equal to the first distance.

15. The cylinder block of claim 9, wherein the first reinforced area and the second reinforced area extend radially away from the first axis.

16. The cylinder block of claim 9, wherein:

a wall of the cylinder block body comprises a first material, and the first reinforced area comprises a second material.

17. The cylinder block of claim 9, wherein the first reinforced area and the second reinforced area comprise cylinder ribs formed into the cylinder block body.

18. The cylinder block of claim 11, wherein the cylinder block body further comprises:

a plurality of cylinder openings;

a plurality of sets of head fasteners disposed on the top surface, each of the plurality of sets of head fasteners positioned circumferentially around a respective cylinder opening of the plurality of cylinder openings; and a plurality of sets of main fasteners disposed on the inner bottom surface, each of the plurality of sets of main fasteners positioned circumferentially around a respective cylinder opening of the plurality of cylinder openings.

19. The cylinder block body of claim 18, wherein:

a first set of head fasteners comprises a first head fastener, a second head fastener, a third head fastener, and a fourth head fastener, the first set of head fasteners positioned circumferentially around a first cylinder opening of the plurality of cylinder openings, and a second set of head fasteners comprises the first head fastener, the second head fastener, a fifth head fastener, and a sixth head fastener, the second set of head fasteners positioned circumferentially around a second cylinder opening of the plurality of cylinder openings, the second cylinder opening adjacent the first cylinder opening.

20. The cylinder block body of claim 18, wherein:

a first set of main fasteners comprises a first main fastener, a second main fastener, a third main fastener, and a fourth main fastener, the first set of main fasteners positioned circumferentially around a first cylinder opening of the plurality of cylinder openings, and a second set of main fastener comprises the first main fastener, the second main fastener, a fifth main fastener, and a sixth main fastener, the second set of main fasteners positioned circumferentially around a second cylinder opening of the plurality of cylinder openings, the second cylinder opening adjacent the first cylinder opening.

* * * * *